United States Patent
Previdi et al.

(10) Patent No.: US 8,144,628 B2
(45) Date of Patent: Mar. 27, 2012

(54) ACKNOWLEDGEMENT-BASED REROUTING OF MULTICAST TRAFFIC

(75) Inventors: Stefano Previdi, Rome (IT); Dino Farinacci, San Jose, CA (US); Ijsbrand Wijnands, Leuven (BE); Arjen Boers, Sitges (ES)

(73) Assignee: Cisco Technology, Inc., San Jose, CA (US)

( * ) Notice: Subject to any disclaimer, the term of this patent is extended or adjusted under 35 U.S.C. 154(b) by 754 days.

(21) Appl. No.: 11/333,843

(22) Filed: Jan. 18, 2006

(65) Prior Publication Data

US 2007/0133530 A1 Jun. 14, 2007

Related U.S. Application Data

(60) Provisional application No. 60/749,957, filed on Dec. 13, 2005.

(51) Int. Cl.
*H04L 12/28* (2006.01)
*H04L 12/56* (2006.01)

(52) U.S. Cl. ...... 370/256; 370/408

(58) Field of Classification Search ...... 370/256, 370/408, 432; 709/227, 229
See application file for complete search history.

(56) References Cited

U.S. PATENT DOCUMENTS

| | | | | |
|---|---|---|---|---|
| 5,517,494 | A * | 5/1996 | Green | 370/408 |
| 6,252,856 | B1 * | 6/2001 | Zhang | 370/254 |
| 6,331,983 | B1 * | 12/2001 | Haggerty et al. | 370/400 |
| 6,917,985 | B2 * | 7/2005 | Madruga et al. | 709/238 |
| 7,016,351 | B1 * | 3/2006 | Farinacci et al. | 370/392 |
| 7,289,505 | B2 * | 10/2007 | Sanchez et al. | 370/393 |
| 7,310,335 | B1 * | 12/2007 | Garcia-Luna-Aceves et al. | 370/390 |
| 7,529,199 | B1 * | 5/2009 | Wijnands et al. | 370/256 |
| 7,933,267 | B1 * | 4/2011 | Aggarwal et al. | 370/389 |
| 7,953,027 | B2 * | 5/2011 | Previdi et al. | 370/256 |
| 2001/0034793 | A1 * | 10/2001 | Madruga et al. | 709/238 |
| 2001/0037472 | A1 * | 11/2001 | Li | 714/4 |
| 2002/0065886 | A1 | 5/2002 | Kim et al. | 709/205 |
| 2002/0120741 | A1 | 8/2002 | Webb et al. | 709/225 |
| 2002/0150094 | A1 * | 10/2002 | Cheng et al. | 370/389 |
| 2003/0063608 | A1 | 4/2003 | Moonen | 370/390 |
| 2004/0105416 | A1 | 6/2004 | Rue | 370/338 |
| 2004/0205215 | A1 * | 10/2004 | Kouvelas et al. | 709/231 |
| 2005/0201278 | A1 * | 9/2005 | Banerjee et al. | 370/229 |
| 2006/0120327 | A1 * | 6/2006 | Suh | 370/331 |
| 2006/0221861 | A1 * | 10/2006 | Previdi et al. | 370/254 |
| 2006/0221866 | A1 | 10/2006 | Shepherd | 370/255 |

(Continued)

OTHER PUBLICATIONS

Beichuan Zhang, "Host Multicast: A Framework for Delivering Multicast to End Users," Jun. 23-27, 2002, IEEE vol. 3 p. 1366-1375.*

(Continued)

*Primary Examiner* — Dang Ton
*Assistant Examiner* — Ryan Kavleski
(74) *Attorney, Agent, or Firm* — Campbell Stephenson LLP (57) ABSTRACT

Various techniques for exchanging control messages in order to gracefully reroute multicast traffic are disclosed. For example, one method involves sending a join message for a multicast group towards a root of a new multicast tree and forwarding multicast traffic, addressed to the multicast group, on a current multicast tree until an acknowledgment corresponding to the join message is received. The new multicast tree can be identified in response to detection of a topology change within the network. Until the acknowledgment is received, multicast traffic that is received via the new multicast tree can be dropped.

15 Claims, 7 Drawing Sheets

U.S. PATENT DOCUMENTS

| | | | | |
|---|---|---|---|---|
| 2006/0221975 | A1 | 10/2006 | Lo et al. | 370/395.5 |
| 2006/0250999 | A1* | 11/2006 | Zeng et al. | 370/312 |
| 2007/0019646 | A1* | 1/2007 | Bryant et al. | 370/390 |
| 2007/0091827 | A1* | 4/2007 | Boers et al. | 370/255 |
| 2007/0091891 | A1 | 4/2007 | Zwiebel et al. | 370/390 |
| 2007/0140107 | A1 | 6/2007 | Eckert et al. | 370/216 |
| 2007/0189193 | A1* | 8/2007 | Previdi et al. | 370/256 |
| 2008/0002693 | A1 | 1/2008 | Moki et al. | 370/390 |

OTHER PUBLICATIONS

Boers, A., et al., *Format for Using PIM Proxies*, Internet Engineering Task Force (IETF), Feb. 2006, pp. 1-7, http://www3.ietf.org/proceedings/05mar/IDs/draft-ietf-pim-proxy-00.txt.

Boers, A., et al., *Format for Using TLVs in PIM Messages*, Internet Engineering Task Force (IETF), Oct. 2005, pp. 1-8, http://tools.ietf.org/wg/pim/draft-ietf-pim-join-attributes/draft-ietf-pim-join-attributes-00.txt.

Bonaventure, Olivier, et al., *Towards Multicast Fast Reroute*, Computing Science and Engineering Department, UCL, Nov. 21, 2005, pp. 1-75.

Aiguo Fei, et al., "A 'Dual Tree' Scheme for Fault-Tolerant Multicast," Proceedings of ICC, 2001, Helsinki (Finland), Jun. 11-14, 2001, XP010553091 © 2001, IEEE, pp. 690-694.

D. Estrin, Network Working Group—Request for Comments: 2362, "Protocol Independent Multicast-Sparse Mode (PIM-SM): Protocol Specification," Jun. 1998, pp. 1-67.

B. Cain et al., Network Working Group—Request for Comments: 3376, "Internet Group Management Protocol, Version 3," Oct. 2002, pp. 1-53.

Xu, Xiaohu, "Multicast in BGP/MPLS VPN," L3VPN Working Group, Huawei Technologies Co., Ltd., Oct. 17, 2005, http://www.watersprings.org/pub/id/draft-xu-l3vpn-2547bix-mcast-01.txt, pp. 1-11.

Xu, Xiaohu, E-mail entitled "RPF Checking for Fast Convergence of MVPN," Feb. 20, 2006, http://www.ietf.org/mail-archive/web/l3vpn/current/msg01434.html, pp. 1-2.

* cited by examiner

Acknowledged Join Message 100

Loopback Address 120

ACKNOWLEDGEMENT-BASED REROUTING OF MULTICAST TRAFFIC

This invention claims priority, under 35 U.S.C. §119 (e), to U.S. Provisional Application 60/749,957, entitled "Acknowledgment-Based Rerouting of Multicast Traffic," which was filed on Dec. 13, 2005 and names Stefano Previdi, Dino Farinacci, Ijsbrand Wijnands, and Aijen Boers as inventors. The above-referenced application is hereby incorporated by reference in its entirety as if completely and fully set forth herein.

FIELD OF THE INVENTION

This invention relates to networking and, more particularly, to multicast routing within a network.

DESCRIPTION OF THE RELATED ART

New multicast trees often need to be established when routing changes such as link or node failures and link or node restorations are detected. Any routing change that occurs in a network where multicast trees have been established may cause packet loss during the time required for the multicast routing protocol to establish a new multicast tree. Typically, a new multicast tree is established by sending prune messages to remove one or more nodes from an existing tree and then sending join messages to add one or more nodes to the new multicast tree. Between the time that the prune message is sent and the time that the join message is processed by an upstream node, packet loss is likely to occur.

In multicast networking systems, minimizing packet loss is an important goal. In current Internet Protocol (IP) multicast networks, convergence after a failure is typically relatively fast, and thus packet loss due to the failure can be minimized. Often, however, IP multicast networks are not able to converge as quickly after a restoration of an old network component (i.e., when a failed link or node returns to operation) or addition of a new network component. Thus, packet loss is often greater due to restorations and additions than to failures.

The fact that restorations and additions to the network can cause packet loss is especially troubling because there is no underlying loss of connectivity in the network. In other words, while at least some packet loss is expected when a failure occurs and the network is consequentially disrupted, packet loss is less acceptable in the presence of restorations. Despite these concerns, however, it is difficult to transition from an old multicast tree to a new multicast tree in restoration situations without incurring undesirable effects, such as packet duplication and packet loss. For example, if a node sends a prune on the old tree and a join on the new tree, a situation may arise in which the prune is processed but the join is lost. In this situation, the node that sent the join and prune messages will be, at least temporarily, cut off from the multicast traffic entirely, since the node will not be receiving the multicast traffic via either tree.

As another example, if a node sends a join on the new tree before sending a prune message on the old tree in an attempt to prevent packet loss, the node may instead receive duplicate packets via both trees for a short period of time. In some situations, duplicate packets may be as undesirable as packet loss, and thus this does not provide an effective solution. Accordingly, new techniques are desirable for handling network events, such as link restorations, with reduced side effects such as packet loss and packet duplication.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 1:
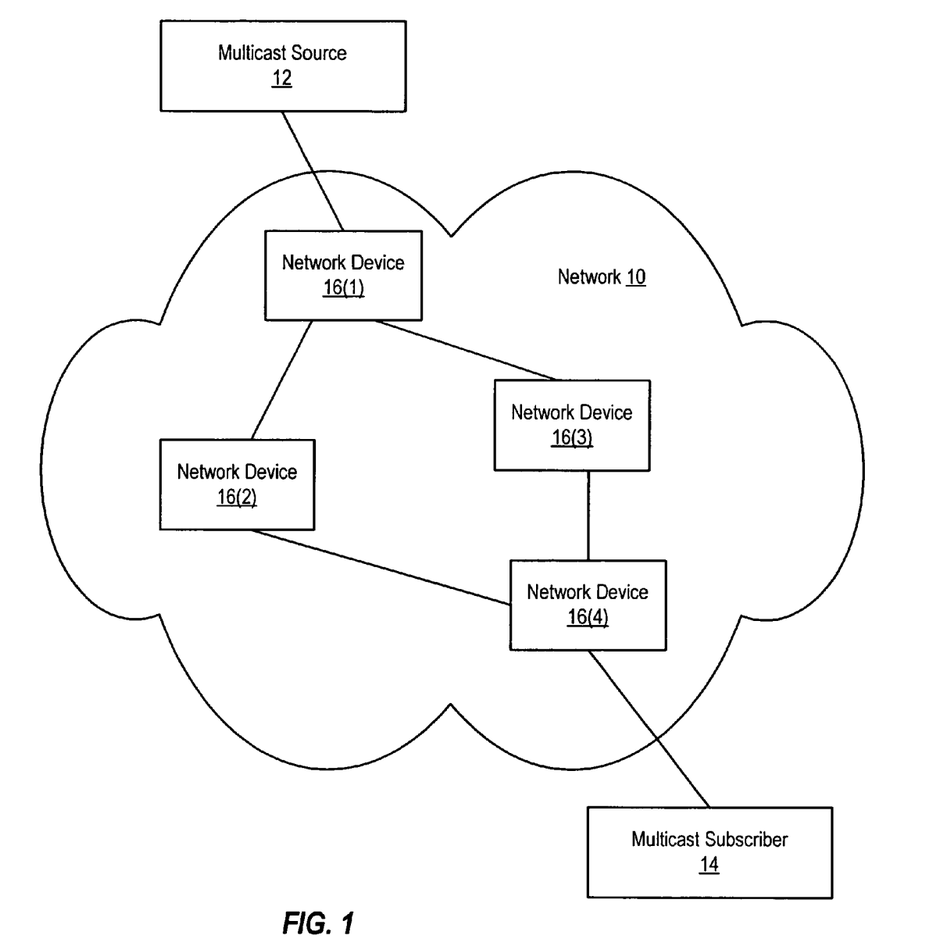
FIG. 1 shows a block diagram of a network, according to one embodiment of the present invention.

FIG. 1 illustrates a network that implements a protocol that supports multicast, such as Protocol Independent Multicast (PIM) or Distance Vector Multicast Routing Protocol (DVMRP). As used herein, PIM refers to any of a variety of different types of PIM, including Source Specific Multicast (PIM-SSM), Dense Mode (PIM-DM), Sparse Mode (PIM-SM), and Bidirectional (PIM-Bidir). The techniques described herein can also be used with any other multicast protocol that implements join- and prune-type messages (i.e., messages that are sent by a node in order to be added to or removed from a multicast tree).

As shown, a network 10 couples a multicast source 12 to a multicast subscriber 14. Network 10 can include one or more local area networks (LANs) and/or wide area networks (WANs). Network 10 can be implemented using any (or a combination) of a variety of different media, including wireless links, satellite links, coaxial cables, fiber optic cables, and the like. Network 10 includes several network devices 16(1)-16(4).

As shown in FIG. 1, multicast source 12 is coupled to network device 16(1). Network device 16(1) is coupled to network device 16(2) and network device 16(3). Network device 16(2) and network device 16(3) are each coupled to network device 16(4). Network device 16(4) is coupled to multicast subscriber 14. It is noted that one device can be coupled to another device either directly by a physical link (as shown in FIG. 1) or indirectly by, for example, a logical tunnel or several physical links and intervening network devices.

Multicast source 12 is configured to send one or more data streams to a multicast group address G. Multicast source 12 is a computing device (e.g., a host computer system, personal digital assistant, cell phone, network appliance, network device, or the like) that encodes a data stream for transmission via network 10 and then sends messages containing the encoded data stream to subscribers via network 10. For example, multicast source 12 can be a video head end that receives a video stream, prepares that video stream for transmission, and sends messages that encode the video stream to subscribers via network 10. While FIG. 1 illustrates a single multicast source, it is noted that other embodiments can include multiple multicast sources that provide the same and/or different streams of data to the same and/or different multicast addresses. Additionally, a single multicast source can source several different streams of data to the same and/or different multicast addresses.

Multicast subscriber 14 is a computing device that subscribes to a multicast group G (e.g., by sending an Internet Group Management Protocol (IGMP) group report to network device 16(4), which causes network device 16(4) to generate a multicast group join according to, for example, Protocol Independent Multicast (PIM) Source Specific Multicast (SSM) protocol). Multicast subscriber 14 then receives a data stream addressed to multicast group G via network 10, decodes the data stream, and presents the decoded data stream to users (e.g., via a display device such as a monitor and/or an audio device such as a speaker). Multicast subscriber 14 can be a personal computer, personal digital assistant, cell phone, network appliance, set top box, and the like.

Network devices 16(1)-16(4) include various network devices (e.g., routers and/or switches) that perform routing functions and support a routing protocol. Each network device 16(l)-16(4) maintains one or more routing tables that stores routing information identifying routes to various data sources and/or data consumers. Each network device implements a multicast routing protocol that is used to convey multicast data packets from multicast source 12 to multicast subscriber 14. For each multicast group to which multicast source sends data, the multicast routing protocol can establish a multicast tree (also referred to as a multicast distribution tree), which is a group of coupled nodes that can convey packets from the multicast source to the multicast subscribers.

A path is a logical or physical communications pathway via which packets (such as multicast join and prune messages as well as multicast data packets) can be sent to a particular device. A path can include one or more physical or logical network links, as well as one or more network devices coupled to such network links. For purposes of this disclosure, a "packet" may include a cell, datagram, frame, message, segment, or any other logical group of information that is conveyed via a network. Network devices perform switching and routing functions in order to convey packets from a source to a destination along a path.

Nodes and links within network 10 can be removed from network 10 (e.g., due to failure, maintenance, network reconfiguration, and the like). Nodes and links can also be added to network 10. These added nodes and links may be devices that were previously removed from the network due to failure or new devices that are being added to expand or provide redundancy within the network. When a new link or node becomes available (e.g., due to being restored) within network 10, a routing protocol will detect the new link or node and make the new resource available in the topology. In some embodiments, the multicast routing protocol is dependent upon an underlying unicast routing protocol, and thus the multicast routing protocol relies upon the unicast routing protocol (e.g., such as Interior Gateway Protocol (IGP)) to detect topology changes. In such embodiments, the multicast routing protocol detects topology changes in response to updates to the unicast routing topology. In other embodiments, the multicast routing protocol directly detects routing changes, without relying on a unicast routing protocol.

Once a topology change is detected, a routing protocol (either the multicast routing protocol or the underlying unicast routing protocol) determines whether any multicast trees are affected (e.g., if the new link or node provides a better path to a multicast source and/or rendezvous point). If a multicast tree is affected, the multicast routing protocol will begin switching traffic from the old tree (which no longer provides the best path to the multicast source and/or rendezvous point) to a new tree (which now provides the best path). For example, if PIM-SM is being implemented and the new topology provides a better shortest path tree for a particular multicast source that is sending to a particular multicast group, PIM-SM will cause one or more nodes (network devices) along the current shortest path tree to send prune messages on the old tree (causing those nodes to be removed from that tree) and to send join messages on the new tree (causing those nodes to be added to the new tree). As another example, a link or node addition or restoration can occur in a network in which Fast Reroute (FRR) technologies are deployed. FRR techniques prevent traffic disruption using pre-computed backup paths. When a topology change occurs, the FRR protocol can recalculate the paths, potentially detecting that a new path should be used instead of an existing path (in such a situation, the existing path may be retained as a backup path).

The multicast routing protocol is configured to handle the transition between the old multicast tree and the new multicast tree in a manner that reduces the likelihood of both packet loss and packet duplication. In particular, the multicast routing protocol is configured to send a join message on the new multicast tree prior to sending a prune on the old multicast tree. The multicast routing protocol waits for an indication that the new multicast tree has been established before sending a prune message on the old multicast tree. Until the prune message is sent, the multicast routing protocol ensures that multicast traffic received via the old multicast tree is forwarded to subscribers, while any multicast traffic received via the new multicast tree is dropped.

In some embodiments, the multicast routing protocol operates to transition between trees on an affected node by causing that node to send a special join message on the new tree. The special join message differs from conventional join messages in that the special join message requests an acknowledgment (such special join messages are consequentially referred to as "acknowledgment-requesting join messages" herein).

A node that receives an acknowledgment-requesting join first identifies whether the multicast tree that is specified in the join message has been established at the receiving node, e.g. by checking for state information corresponding to the multicast group associated with the tree. If such state information does not exist, the receiving node will create that state information and forward the join message towards the root of the tree (both of these activities would also be performed in response to a normal, non-acknowledgment-requesting join message). No acknowledgment is sent by the receiving node in this situation.

If instead the receiving node detects that state information already exists, the receiving node will update the list of outgoing interfaces (OIFs) associated with the multicast group identified in the join message to include the interface that received the acknowledgment-requesting join message (this activity would also be performed for a non-acknowledgment-requesting join message). The receiving node additionally generates an acknowledgment and sends that acknowledgment to the node that originated the acknowledgment-requesting join message.

It is noted that several intervening network devices may handle an acknowledgment-requesting join message before an acknowledgment is generated. Since the acknowledgment is only generated when a receiving node, which is already part of the new multicast tree, handles the acknowledgment-requesting join message, the originating node (the node that sent the acknowledgment-requesting join message) will not receive an acknowledgment until the originating node has been joined to the new tree.

While waiting for an acknowledgment, the originating node continues to forward multicast traffic that is being conveyed via the old multicast tree (in one embodiment, this is implemented by maintaining the multicast forwarding state information associated with the old multicast tree until an acknowledgment is received). Thus, multicast traffic to subscribers that receive multicast packets via that node is unlikely to be disrupted while the new tree is being established. Additionally, before the acknowledgment is received, any multicast traffic received via the new multicast tree will be dropped, thus preventing packet duplication.

Once the node receives an acknowledgment that corresponds to the acknowledgment-requesting join message, the node determines that the new multicast tree has been established. At this point, the node sends a prune message on the old multicast distribution tree and begins forwarding multicast traffic received via the new tree. Any multicast traffic received via the old tree will subsequently be dropped. Since the node prunes the old tree after determining that the new tree is established, there is a very low likelihood of dropped or duplicate multicast packets occurring in response to the switchover.

As an example of how these techniques can be used, assume that at time T0, multicast packets are being conveyed from multicast source 12 to multicast subscriber 14 via a multicast tree that includes network devices 16(1), 16(3), and 16(4). At T0, network device 16(2) is not present in network 10. At time T1, network device 16(2) is coupled between network devices 16(1) and 16(4), as shown in FIG. 1. The unicast routing protocol in use within network 10 detects this change in topology and updates the unicast routing information maintained within network 10 appropriately.

In response to the unicast topology change, the multicast routing protocol implemented within network 10 determines whether any multicast trees are affected by the topology change. In this situation, the multicast routing protocol may detect that a new shortest path tree, which includes network devices 16(1), 16(2), and 16(4), now exists for routing multicast packets between multicast source 12 and multicast subscriber 14. In response to detecting this situation, affected nodes, such as network device 16(4), will begin the process of switching from the old tree (which includes network devices 16(1), 16(3), and 16(4)) to the new tree.

In response to identifying the new shortest path tree, network device 16(4) sends an acknowledgment-requesting join message to network device 16(2). Network device 16(4) continues to forward multicast traffic received via the old tree (i.e., multicast packets received from network device 16(3)). Any multicast packets received via the new tree are dropped.

Network device 16(2) receives the acknowledgment-requesting join message. Since network device 16(2) has not received any prior join messages for this multicast group G, network device 16(2) has not established any multicast forwarding state for multicast group G. Accordingly, network device 16(2) cannot generate an acknowledgment. Instead, network device 16(2) creates multicast forwarding state for multicast group G (identifying the interface leading to network device 16(4) in the outgoing interface list) and forwards the acknowledgment-requesting join to network device 16(1).

Network device 16(1) receives the acknowledgment-requesting join message. Since network device 16(1) already maintains multicast forwarding state for multicast group G (network device 16(1) is also part of the old multicast tree), network device 16(1) generates an acknowledgment message and sends the message to network device 16(4). Network device 16(1) also adds the interface leading to network device 16(2) to its outgoing interface list for multicast group G. At this point, multicast traffic will flow to network device 16(4) via the new multicast tree.

Network device 16(4) receives the acknowledgment from network device 16(1). In response to the acknowledgment, network device 16(4) sends a prune message specifying multicast group G to network device 16(3). Network device 16(4) also begins forwarding multicast traffic received via the new tree (i.e., multicast packets received from network device 16(2)) and dropping multicast traffic received via the old tree (i.e., multicast packets received from network device 16(3)).

In response to the prune message, network device 16(3) removes the interface leading to network device 16(4) from its outgoing interface list for multicast group G. If network device 16(3) now has no interfaces in its outgoing interface list for that multicast group, network device 16(3) will also send a prune message to network device 16(1). In response to this prune message, network device 16(1) removes the interface that sends packets to network device 16(3) from its outgoing interface list for multicast group G.

Figure 2:
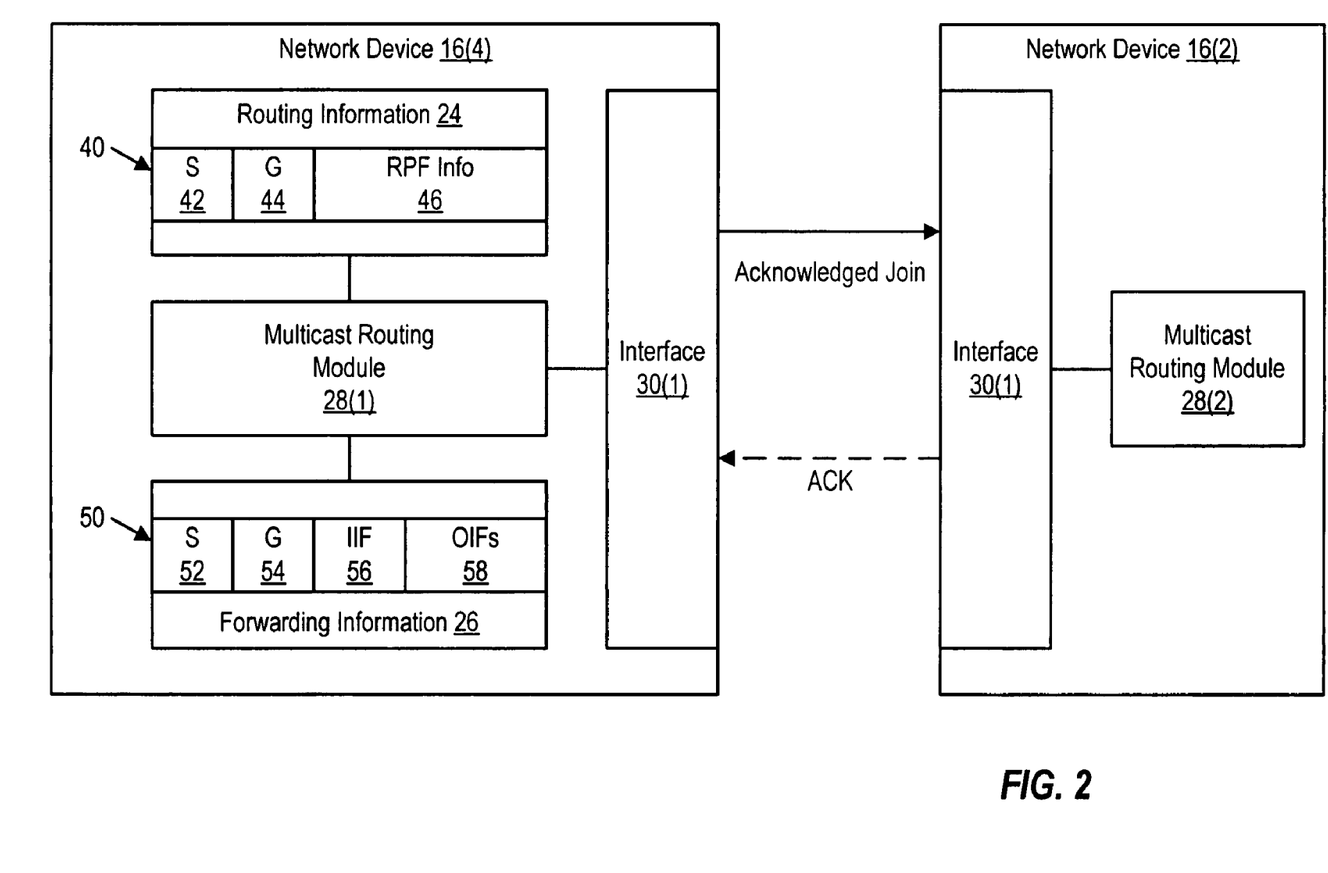
FIG. 2 is a block diagram of two network devices that implement a multicast protocol, according to one embodiment of the present invention.

FIG. 2 is a block diagram of two network devices that implement a multicast protocol. As shown, network device 16(4) is coupled to network device 16(2) (e.g., as shown previously in FIG. 1). Network device 16(4) is configured to use acknowledgment-requesting join messages when switching between multicast trees, and network device 16(2) is configured to handle acknowledgment-requesting join messages.

Network device 16(4) includes storage for multicast routing information 24, storage for multicast forwarding information 26, a routing module 28(1), and an interface 30(1). Similarly, network device 16(2) includes a routing module 28(2) and an interface 30(2) (network device 16(2) can also include storage for multicast routing and forwarding information). Interfaces 30(1) and 30(2) are coupled to send and receive packets. It is noted that each network device 16(4) and 16(2) may include additional interfaces, and that each interface can be a logical or physical interface.

Routing module 28(1) is configured to perform multicast routing based on the stored multicast routing information 24. Routing module 28(1) is also configured to update the stored multicast forwarding information 26. A forwarding engine (not shown) can forward multicast data packets using the stored multicast forwarding information 26. Routing modules 28(1) and 28(2) can each implement one or more instances of a unicast routing protocol and one or more instances of a multicast routing protocol.

Entry 40 provides an example of the routing information that can be stored for a particular multicast group. As shown, entry 40 includes a source address (S) 42, a group address (G) 44, and reverse path forwarding (RPF) identifying information ("RPF info") 46. The RPF identifying information identifies which interface within network device 16(1) properly receives multicast data packets addressed to group G, as well as the RPF neighbor that is properly forwards those multicast data packets. The RPF interface is the interface leading to the root of the multicast tree for group G (e.g., the root of the multicast tree can be the rendezvous point associated with group G). The storage for multicast routing information 24 is, in one embodiment, implemented as a Multicast Routing Information Base (MRIB).

Entry 50 provides an example of the forwarding information that can be stored for a particular multicast group. As shown, entry 50 includes a source address (S) 52, a group address (G) 54, an incoming interface (IIF) list 56, and an outgoing interface (OIF) list 58. A forwarding engine uses the information in entry 50 to forward multicast data packets addressed to multicast group G. For example, when a packet having destination address G is received, the forwarding engine accesses entry 50 and verifies the source address and incoming interface of the packet. If the packet was received via an interface other than the one identified in IIF 56, the packet is dropped. If the packet matches the information in entry 50, the packet is forwarded from the interfaces listed in OIF 58. The storage for multicast routing information 24 is, in one embodiment, implemented as a Multicast Forwarding Information Base (MFIB).

When routing module 28(1) detects a topology change, routing module 28(1) determines whether the topology change affects any multicast trees to which network device 16(4) is currently joined. If so, routing module 28(1) can begin switching to a new tree by sending acknowledgment-requesting join messages on the new tree while continuing to receive and forward multicast data traffic via the old tree.

The routing module 28(1) can, in some embodiments, differentiate between different types of topology changes that affect multicast trees. For example, if a topology change, such as a device or link failure, disrupts an established multicast tree, routing module 28(1) can use conventional techniques to switch to a new tree. If instead a topology change, such as a link or node restoration or addition, creates a new tree that provides improved performance (e.g., as determined using routing cost metrics) relative to the existing tree and does not disrupt the existing tree, routing module 28(1) can use the switchover process disclosed herein to switch to the new tree.

When a topology change that affects an existing multicast tree is detected, multicast routing module 28(1) can identify a new multicast tree by identifying a new RPF interface and/or a new RPF neighbor. If the new RPF neighbor is reached via a different RPF interface than the old RPF neighbor, the new multicast tree can be identified by both the new RPF neighbor and the new RPF interface. If the new RPF neighbor is reached via the same interface as the old RPF neighbor (e.g., in situations in which network device 16(4) is coupled to the new and old RPF neighbors via a multi-access local area network (LAN)), then the new multicast tree is identified by the new RPF neighbor (multicast routing information identifying the RPF interface does not need to be updated, in this situation). Accordingly, multicast routing module 28(1) then stores information identifying the new RPF interface and/or the new RPF neighbor, as appropriate, in the routing information entry 40 that corresponds to the multicast group. Multicast routing module 28(1) does not, however, update the forwarding information for that multicast group at this time.

In response to the new RPF interface and/or the new RPF neighbor being identified in multicast routing information entry 40, network device 16(4) begins sending acknowledgment-requesting join messages to network device 16(2), which in this example is the new RPF neighbor. As noted above, acknowledgment-requesting join message is a type of join message that requests acknowledgment.

Network device 16(2) receives the acknowledgment-requesting join message. Network device 16(2) differentiates between acknowledgment-requesting join messages and normal, non-acknowledgment-requesting join messages based on information included within each type of join message. For example, in one embodiment, several different types of join messages are defined within the multicast routing protocol, and a type field within each join message indicates the type of join message.

In other embodiments, acknowledgment-requesting joins contain additional information that is not included in non-acknowledgment-requesting joins. The presence or absence of this information allows receiving devices to differentiate between acknowledged and non-acknowledgment-requesting join messages. For example, in some embodiments, acknowledgment-requesting join messages contain an address, such as a loopback address, that is associated with originating network device 16(4), and this address is not included in non-acknowledgment-requesting joins. The loopback address can be the address of a virtual "loopback" interface of network device 16(4). Often, loopback interfaces have no associated hardware and are not physically connected to a network. Loopback interfaces are often used to test IP software independently of underlying hardware problems or constraints. It is noted that other addresses that are associated with network device 16(4) can be used instead of the loopback address (e.g., if a loopback address is not available).

In one embodiment, additional information, such as a loopback address, is included in a PIM join message using techniques like those described in the Internet Engineering Task Force (IETF) Internet Draft titled "Format for using TLVs in PIM messages," submitted in October 2005 by A. Boers, I J. Wijnands, and E. Rosen. This draft describes a technique for implementing one or more Type-Length-Value (TLV) fields within the source address field of a PIM join message by defining a new source encoding that identifies each TLV field (if any) present in the PIM join message. The additional information that identifies an acknowledgment-requesting join message can be stored in one of the TLV fields.

In response to receiving the acknowledgment-requesting join message, routing module 28(2) of network device 16(2) determines whether a multicast tree has already been established for the particular multicast group identified in the multicast join message. Routing module 28(2) can determine whether a multicast tree has been established by checking for multicast forwarding and/or routing information that corresponds to the multicast group. If the multicast tree has been established, routing module 28(2) processes the acknowledgment-requesting join message in the normal manner in which a non-acknowledgment-requesting join message would be processed and also sends an acknowledgment (ACK) to network device 16(4). If the multicast tree has not been established, routing module 28(2) does not send an acknowledgment; however, routing module 28(2) will process the join message in the normal manner (which will establish the multicast tree) and then forward the acknowledgment-requesting join message towards the root of the multicast tree.

The acknowledgment is included in a unicast packet. The destination address of the acknowledgment is the address of the network device that originated the acknowledgment-requesting join message. The acknowledgment includes information (e.g., such as the multicast group address G) that allows the acknowledgment to be reconciled with the corresponding acknowledgment-requesting join message. The acknowledgment can be implemented as any type of message. In one embodiment, the acknowledgment message is a multicast protocol message. In contrast, in other embodiments, the acknowledgment message is not defined within the multicast protocol.

When network device 16(4) receives an acknowledgment from network device 16(2) or another node further up the tree, network device 16(4) stops sending acknowledgment-requesting joins (normal, non-acknowledgment-requesting joins can be sent instead if join messages need to be resent periodically to refresh multicast routing information). Network device 16(4) also updates an entry 50 in multicast forwarding information 26 to identify the appropriate incoming interface for the new multicast tree for the multicast group. This causes network device 16(4) to forward multicast data packets received via the new multicast tree and to drop multicast data packets received via the old multicast tree. Network device 16(4) also sends a prune message on the old multicast tree.

Figure 3:
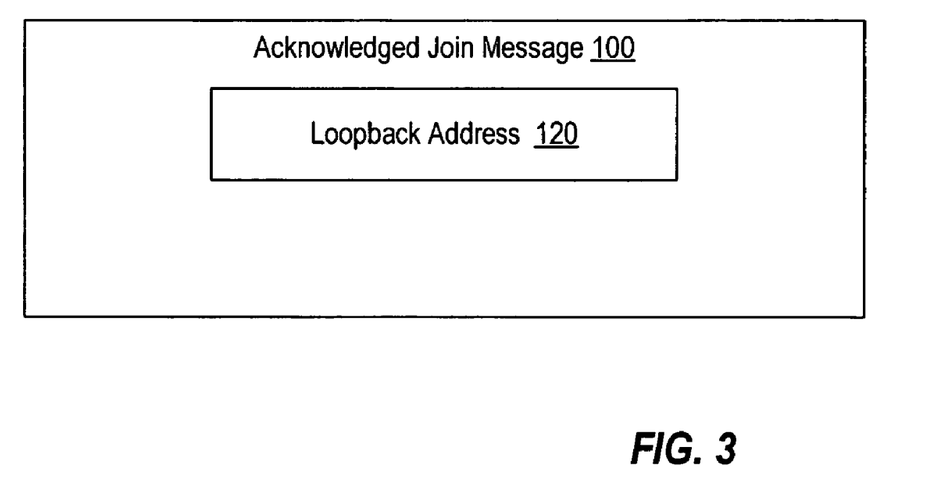
FIG. 3 is a block diagram illustrating an acknowledgment-requesting join message, according to one embodiment of the present invention.

FIG. 3 is a block diagram illustrating an example of an acknowledgment-requesting join message. As shown, acknowledgment-requesting join message includes a loopback address 120. As noted above, the presence of the loopback address can be used to identify that the join is an acknowledgment-requesting join (as opposed to a non-acknowledgment-requesting join). Other information can be included instead of and/or in addition to the loopback address in order to differentiate the acknowledgment-requesting join message from non-acknowledgment-requesting join messages. Additional information included in the acknowledgment-requesting join message can include sequence numbers (e.g., such a number can be copied into a corresponding acknowledgment so that the originator of the message can correctly correlate the acknowledgment with the acknowledgment-requesting join message).

It is noted that a network device that sends an acknowledgment-requesting join message may actually send several such acknowledgment-requesting join messages before receiving an acknowledgment. For example, if the first acknowledgment-requesting join message is lost (e.g., due to congestion or transient network failures), the originating network device may never receive an acknowledgment corresponding to that message. In order to avoid such a scenario, the originating device can resend acknowledgment-requesting join messages periodically (e.g., at the same rate that normal join messages are resent). In some embodiments, the period for resending acknowledgment-requesting join messages is faster than that for resending normal join messages.

It is noted that acknowledgment-requesting join messages can be formatted similarly to non-acknowledgment requesting joins. In embodiments in which normal joins can specify multiple multicast groups, acknowledgment-requesting joins can also specify more than one multicast group. For example, if a topology change affected multicast trees used to convey packets to several different multicast groups, and if new trees for each of those groups include the same RPF neighbor, a single acknowledgment-requesting join message can specify each of those multicast groups. The RPF neighbor (or other nodes in the network) can either generate acknowledgments separately for each group (in which case the acknowledgment should identify each group for which a multicast tree is already established) or collectively for all groups specified in the join message (in which case the acknowledgment should not be sent until processed by a node that has already established multicast trees for all of the identified groups).

Figure 4:
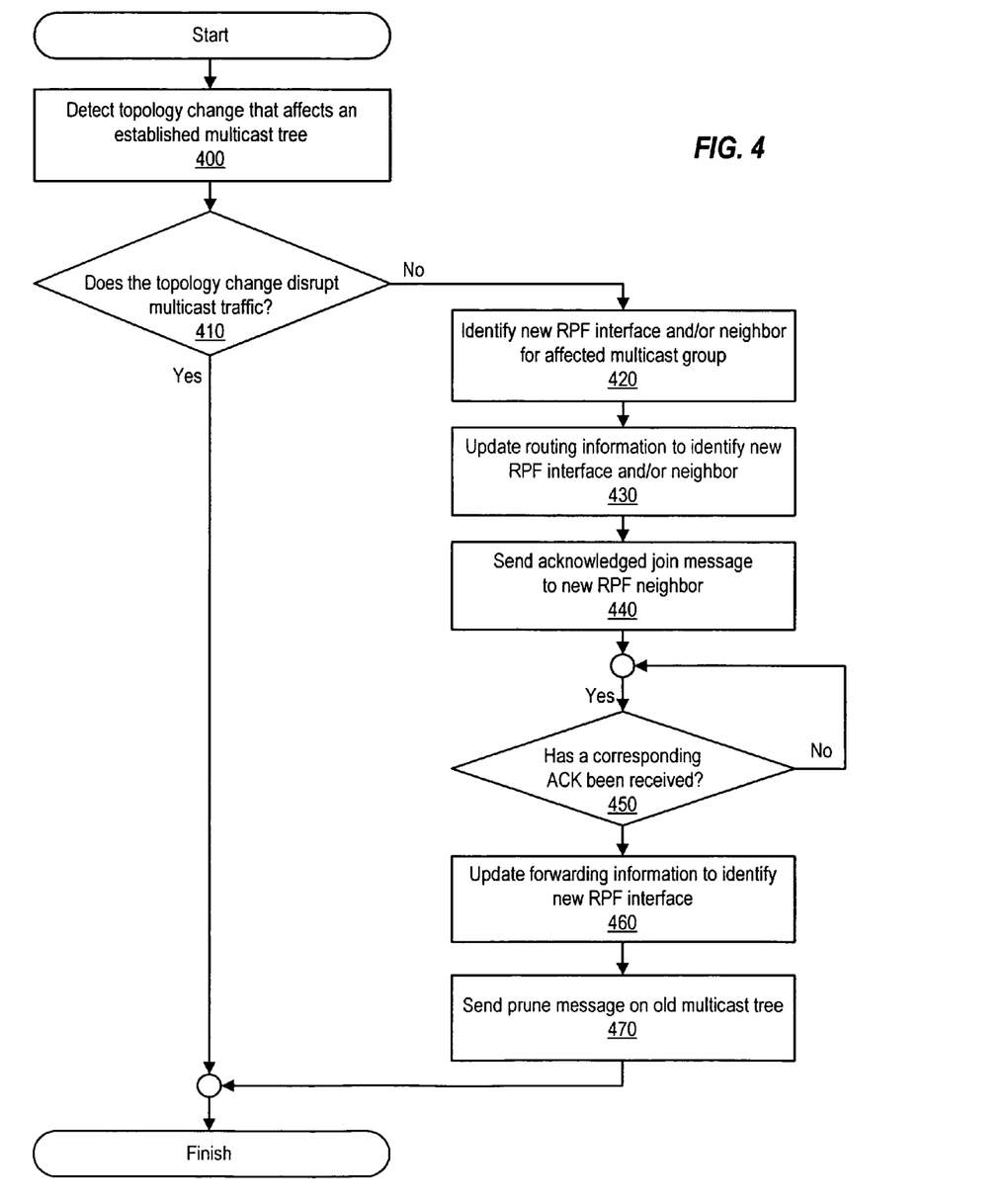
FIG. 4 is a flowchart of a method performed by a network device that sends an acknowledgment-requesting join message, according to one embodiment of the present invention.

FIG. 4 is a flowchart of a method that involves sending an acknowledgment-requesting join message. This method can be performed by a node such as network device 16(4) of FIGS. 1 and 2 in order to switch to a new multicast tree in certain circumstances.

The method begins at 400, when the node detects a topology change that affects an established multicast tree. The node can detect the topology change by implementing a routing protocol, which will update routing information in response to topology changes.

The node next detects whether the topology change will disrupt (either immediately or in the near future) multicast traffic, as indicated at 410. In this example, if the topology change disrupts multicast traffic, the node will use another technique to switch to a new tree. However, it is noted that operation 410 may be eliminated in other embodiments, which can use operations 420-470 to handle any topology change, regardless of whether that topology change is disruptive.

Thus, in this example, if the topology change does not (currently or potentially) disrupt multicast traffic, the node will perform actions 420-470. At 420, the node identifies a new RPF interface and/or a new RPF neighbor for the affected multicast tree. The node then updates the multicast routing information (e.g., in the MRIB) to identify the new RPF interface and/or new RPF neighbor, as indicated at 430. As noted above, if the new RPF neighbor is reachable via the same interface as the old RPF neighbor (e.g., if both are reachable via a multi-access LAN), the RPF interface does not need to be updated. However, the node does not update the corresponding forwarding information to identify the new tree.

The node also sends one or more acknowledgment-requesting join messages via the new RPF neighbor, as shown at 440. The multicast routing protocol is configured to send join messages via the RPF interface specified in the multicast routing information (which may have been updated to identify the new RPF interface identified at 420) to the RPF neighbor specified in the multicast routing information (which has been updated to identify the new RPF neighbor). In this situation, the multicast routing protocol sends acknowledgment-requesting joins instead of normal, non-acknowledgment-requesting join messages. Operation 440 can be repeated (not shown) several times until an acknowledgment is received (at 450). Once an acknowledgment is received, the node can begin sending normal join messages instead of acknowledgment-requesting join messages.

The node waits until an acknowledgment is received, as detected at 450, before performing operation 460 to update the multicast forwarding information to identify the new tree (e.g., by identifying the new RPF interface identified at 420). This update can be implemented by modifying existing forwarding information or by removing forwarding state information corresponding to the old tree and adding new forwarding state information that corresponds to the new tree. The node also waits until an acknowledgment is received before sending a prune message on the old multicast tree, as shown at 470.

Figure 5:
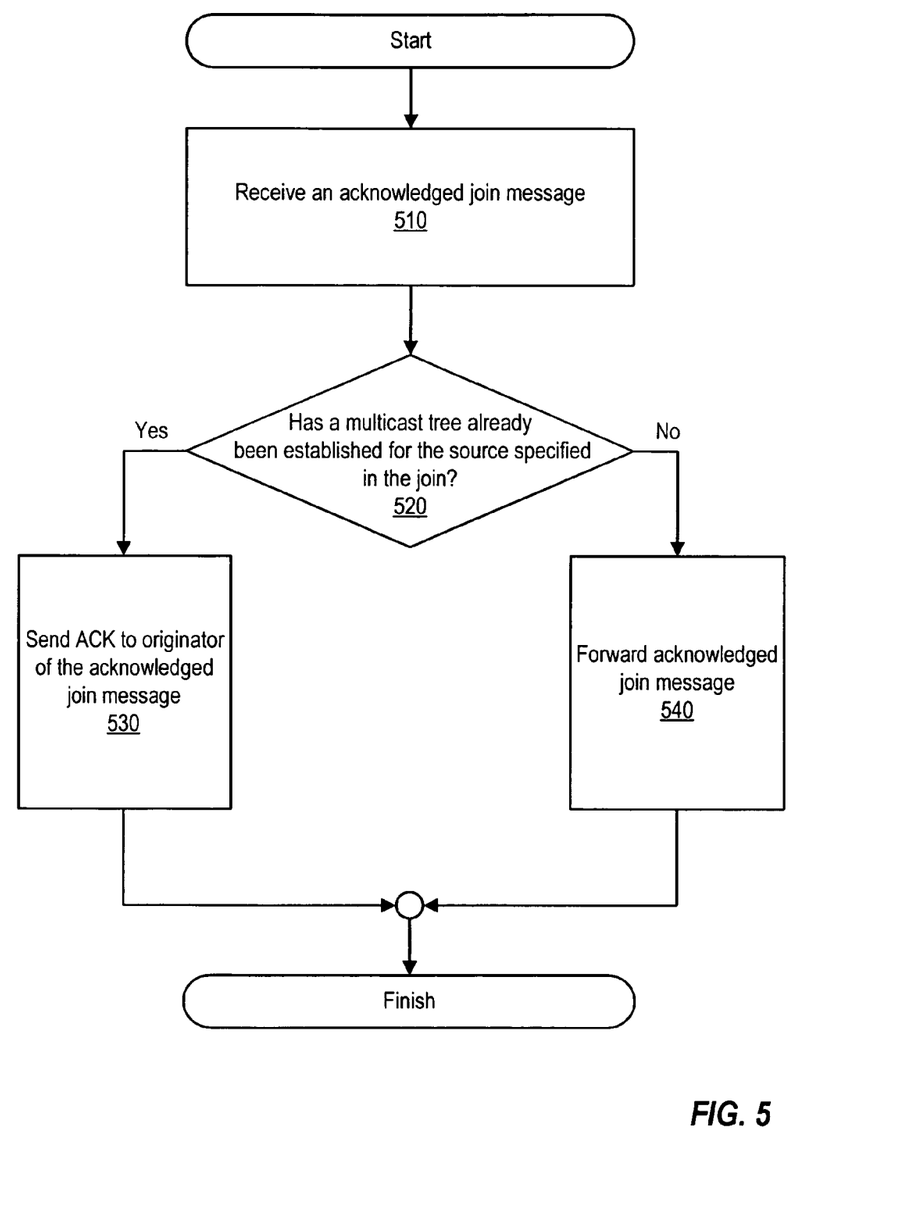
FIG. 5 is a flowchart of a method performed by a network device that receives an acknowledgment-requesting join message, according to one embodiment of the present invention.

FIG. 5 is a flowchart of a method of handling an acknowledgment-requesting join message. The method can be performed by a node such as network device 16(2) of FIGS. 1 and 2.

The method begins at 510, when an acknowledgment-requesting join message is received. The acknowledgment-requesting join message is identified as requesting an acknowledgement (as opposed to being a non-acknowledgment-requesting join message) based upon information included within the join message. Such information can include a particular value of a type field, a loopback address, or any other information that provides a way to differentiate between acknowledged and non-acknowledgment-requesting join messages.

At 520, the node determines whether a multicast tree has already been established for the multicast group specified in the acknowledgment-requesting join message. This determination can be made by accessing multicast routing and/or forwarding information to see whether state information corresponding to the multicast group already exists (e.g., by accessing forwarding information and identifying whether there are any entries in the outgoing-interface list for with the route associated with the multicast group). If such state information already exists for the multicast group, the node determines that the multicast tree is already established.

If a multicast tree has already been established, the node sends an acknowledgment (ACK) to the originator of the acknowledgment-requesting join message, as shown at 530. In one embodiment, the node obtains the address of the originating node from the acknowledgment-requesting join message (e.g., if the acknowledgment-requesting join message includes a loopback address) and uses that address as the destination address of the acknowledgment.

If a multicast tree has not already been established, the node forwards the acknowledgment-requesting join message towards the root of the multicast tree, as shown at 540. Regardless of whether an acknowledgment is sent, the node also processes the acknowledgment-requesting join message in the same manner that a normal join message would be processed (e.g., to create multicast state information corresponding to the specified multicast group, if such state information does not already exist, or to update existing state information in response to the join message).

As noted above, if no acknowledgment is sent, the node forwards the acknowledgment-requesting join message towards the next node along the multicast tree. In some embodiments, the node periodically resends the acknowledgment-requesting join message (this protects against situations in which the one or more earlier-sent acknowledgment-requesting join messages are lost). In such embodiments, the node keeps track of the associated multicast group (e.g., by setting a flag or otherwise updating state information associated with the corresponding multicast group). Additionally, while the node is periodically resending the acknowledgment-requesting join message generated by the originating node, that node will not generate an acknowledgment corresponding to any subsequently-received acknowledgment-requesting join messages from the originating node. If the node subsequently receives a normal join message specifying that multicast group (indicating that the originating node has received an acknowledgment message from another node), the node can clear the flag and stop resending the acknowledgment-requesting join message.

Figure 6:
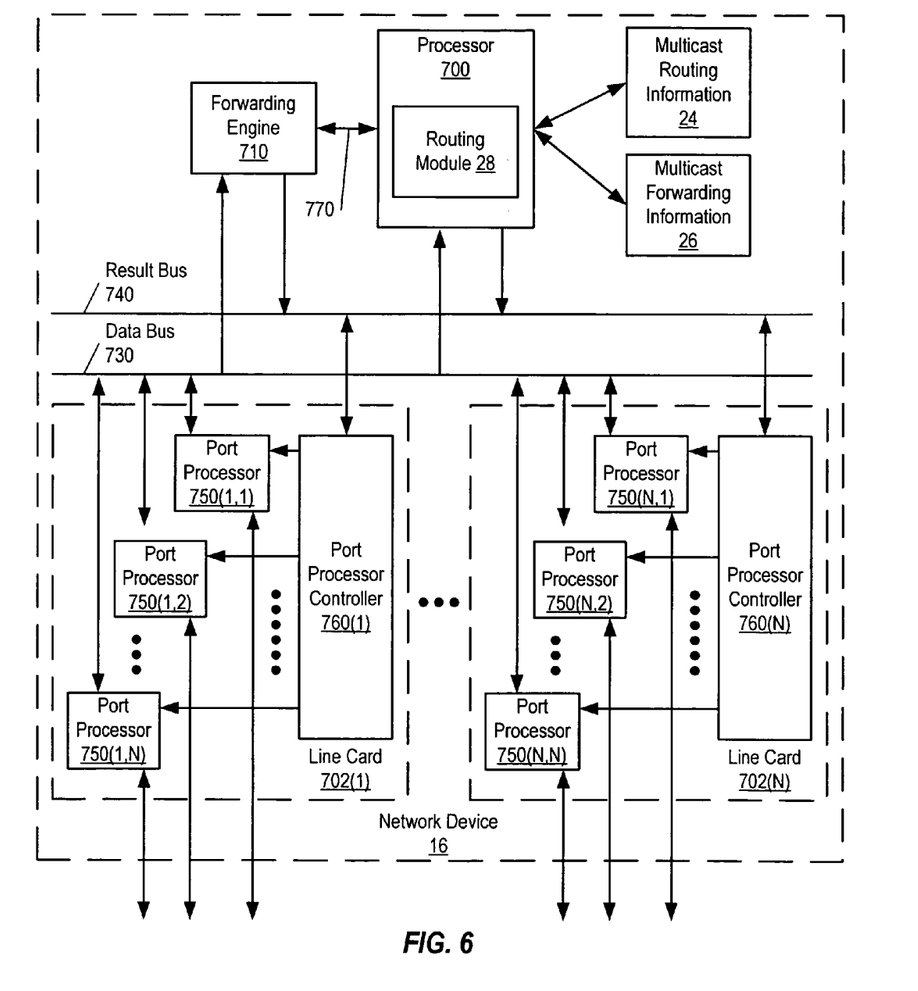
FIG. 6 is a block diagram of a network device, according to one embodiment of the present invention.

FIG. 6 is a block diagram of a network device 16 (e.g., one of network devices 16(1)-16(4) of FIG. 1). In this depiction, network device 16 includes a number of line cards (line cards 702(l)-702(N)) that are communicatively coupled to a forwarding engine 710 and a processor 700, which includes a routing module 28 (e.g., which can implement one or more instances of a multicast routing protocol, like routing modules 28(1) and 28(2) illustrated in FIG. 2, and/or one or more instances of a unicast routing protocol) via a data bus 730 and a result bus 740. Routing module 28 is coupled to maintain multicast routing information 24 and multicast forwarding information 26 (e.g., as shown in FIG. 2).

Line cards 702(1)-702(N) include a number of port processors 750(1,1)-750(N,N) which are controlled by port processor controllers 760(1)-760(N). It will also be noted that forwarding engine 710 and route processor 700 are not only coupled to one another via data bus 730 and result bus 740, but are also communicatively coupled to one another by a communications link 770. It is noted that in alternative embodiments, each line card can include a forwarding engine.

When a message is received, the message is identified and analyzed by a network device such as network device 16 in the following manner, according to embodiments of the present invention. Upon receipt, a message (or some or all of its control information) is sent from the one of port processors 750(1,1)-750(N,N) at which the message was received to one or more of those devices coupled to data bus 730 (e.g., others of port processors 750(1,1)-750(N,N), forwarding engine 710 and/or route processor 700). Handling of the message can be determined, for example, by forwarding engine 710. For example, forwarding engine 710 may determine that the message should be forwarded to one or more of port processors 750(1,1)-750(N,N). This can be accomplished by indicating to corresponding one(s) of port processor controllers 760(1)-760(N) that the copy of the message held in the given one(s) of port processors 750(1,1)-750(N,N) should be forwarded to the appropriate one of port processors 750(1,1)-750(N,N).

Figure 7:
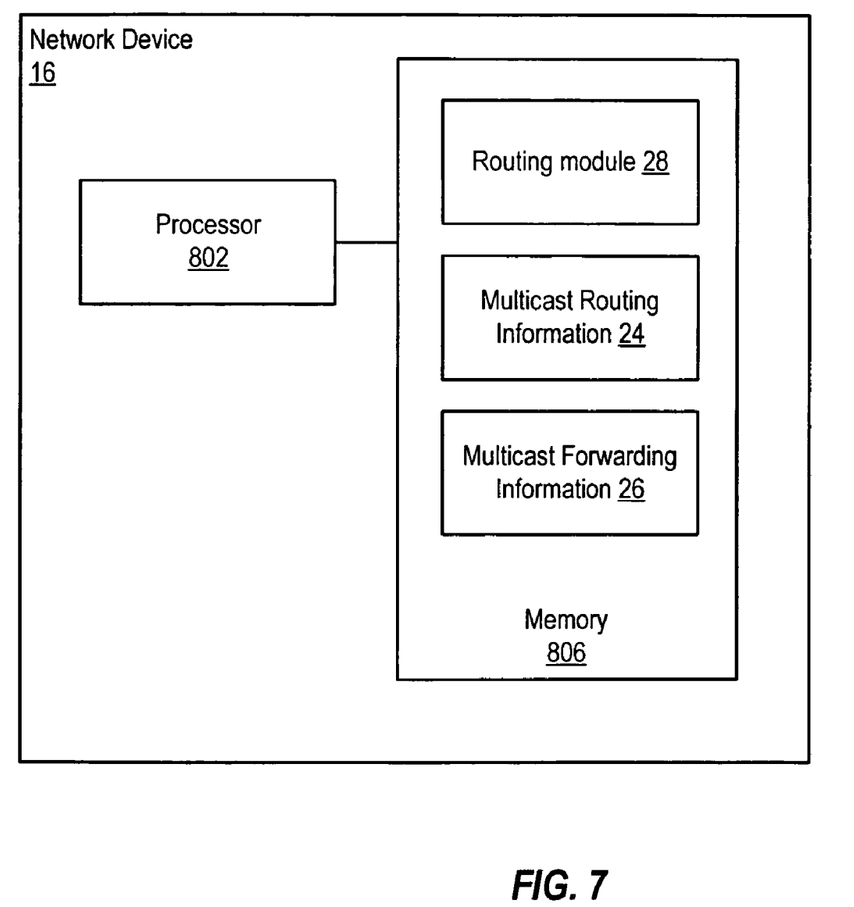
FIG. 7 is another block diagram of a network device, according to one embodiment of the present invention.

FIG. 7 illustrates a block diagram of a network device 16, which illustrates how routing module 28 can be implemented in software. As illustrated, network device 16 includes one or more processors 802 (e.g., microprocessors, PLDs (Programmable Logic Devices), or ASICs (Application Specific Integrated Circuits)) configured to execute program instructions stored in memory 806. Memory 806 can include various types of RAM (Random Access Memory), ROM (Read Only Memory), Flash memory, MEMS (Micro Electro-Mechanical Systems) memory, and the like. Processor 802 and memory 806 can be included in a route processor (e.g., route processor 700 of FIG. 9). Processor 802 and memory 806 are coupled to send and receive data and control signals by a bus or other interconnect.

In this example, program instructions executable to implement routing module 28 are stored in memory 806. Additionally, multicast routing information 24 and multicast forwarding information 26 can also be stored in memory 806 for use by routing module 28. The program instructions and data implementing routing module 28 can be stored on various computer readable media such as memory 806. In some embodiments, routing module 28 software is stored on a computer readable medium such as a CD (Compact Disc), DVD (Digital Versatile Disc), hard disk, optical disk, tape device, floppy disk, and the like). In order to be executed by processor 802, the instructions and data implementing routing module 28 are loaded into memory 806 from the other computer readable medium. The instructions and/or data implementing routing module 28 can also be transferred to network device 16 for storage in memory 806 via a network such as the Internet or upon a carrier medium. In some embodiments, a computer readable medium is a carrier medium such as a network and/or a wireless link upon which signals such as electrical, electromagnetic, or digital signals, on which the data and instructions implementing routing module 28 are encoded, are conveyed.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A method comprising:
sending a join message for a multicast group towards a root of a new multicast tree, wherein
multicast forwarding information and multicast routing information are associated with the multicast group, and
prior to the join message being sent, the multicast routing information and the multicast forwarding information identify a current multicast tree;
in response to sending the join message,
inhibiting updating of the multicast forwarding information to identify the multicast tree, until receipt of an acknowledgement message corresponding to the join message; and
updating the multicast routing information to identify the new multicast tree, prior to the receipt of the acknowledgement message, wherein
the sending, the inhibiting updating, and the updating are performed by a network device.

2. The method of claim 1, further comprising:
detecting a topology change within a network;
identifying the new multicast tree, in response to detection of the topology change.

3. The method of claim 2, wherein the multicast routing information is updated to identify a new reverse path forwarding neighbor, in response to identifying the new multicast tree.

4. The method of claim 3, wherein the multicast forwarding information is updated to identify a new reverse path forwarding interface, in response to the receipt of the acknowledgement message corresponding to the join message.

5. The method of claim 1, wherein the join message comprises a loopback address.

6. The method of claim 1, further comprising:
dropping multicast packets received via the new multicast tree, until the acknowledgement message corresponding to the join message is received.

7. A network device comprising:
a storage module comprising multicast forwarding information and multicast routing information, wherein
the multicast forwarding information and the multicast routing information are associated with a multicast group; and
a routing module coupled to access the multicast forwarding information and the multicast routing information, wherein the routing module is configured to:
send a join message specifying the multicast group towards a root of a new multicast tree, wherein
prior to the join message being sent, the multicast forwarding information and the multicast routing information identify a current multicast tree;
inhibit updating the multicast forwarding information to identify the new multicast tree until receipt of an indication that the new multicast tree has been established; and
update the multicast routing information to identify the new multicast tree, prior to the receipt of the indication that the new multicast tree has been established.

8. The network device of claim 7, wherein
the routing module is further configured to, in response to the receipt of the indication that the new multicast tree has been established:
update the multicast forwarding information to identify the new multicast tree, and
send a prune message on the current multicast tree.

9. The network device of claim 7, wherein
the join message is an acknowledgement-requesting join message, and
the indication that the new multicast tree has been established comprises an acknowledgment corresponding to the acknowledgment-requesting join message.

10. The network device of claim 7, wherein the routing module is further configured to:
detect a topology change within a network;
identify the new multicast tree, in response to detection of the topology change.

11. The network device of claim 7, wherein the join message comprises a loopback address.

12. A system comprising:
a first network device configured to:
send a join message for a multicast group towards a root of a new multicast tree, wherein
multicast forwarding information and multicast routing information are associated with the multicast group, and
prior to the join message being sent, the multicast forwarding information and the multicast routing information identify a current multicast tree;
in response to the join message being sent,
inhibit updating the multicast forwarding information to identify the new multicast tree until receipt of an acknowledgement message corresponding to the join message; and
update the multicast routing information to identify the new multicast tree, until prior to the receipt of the acknowledgement message.

13. The system of claim 12, further comprising:
a second network device coupled to the first network device, wherein the second network device is configured to:
receive the join message,
identify whether a multicast state corresponding to the multicast group already exists, and
send the acknowledgement message to the first network device, if the multicast state already exists.

14. The system of claim 12, wherein the first network device is configured to:
detect a topology change within a network; and
identify the new multicast tree, in response to detection of the topology change.

15. A system comprising:
means for sending, from a network device, a join message for a multicast group towards a root of a new multicast tree, wherein
multicast forwarding information and multicast routing information are associated with the multicast group, and
prior to the join message being sent, the multicast forwarding information and the multicast routing information identify a current multicast tree;
in response to sending the join message,
means for inhibiting, on the network device, updating of the multicast forwarding information to identify the new multicast tree, until receipt of an acknowledgement message corresponding to the join message; and
means for updating, on the network device, multicast routing information to identify the new multicast tree, prior to the receipt of the acknowledgement.

* * * * *